United States Patent
Bakos et al.

(10) Patent No.: US 11,934,300 B2
(45) Date of Patent: Mar. 19, 2024

(54) REDUCING COMPUTING POWER FOR GENERATING TEST SCENARIO FILES FOR DECISION MODELS

(71) Applicant: RED HAT, INC., Raleigh, NC (US)

(72) Inventors: Alexandre Porcelli Bakos, Westford, MA (US); Eder Ignatowicz, Westford, MA (US); Paulo Rego, Sao Paulo (BR)

(73) Assignee: Red Hat, Inc., Raleigh, NC (US)

( * ) Notice: Subject to any disclaimer, the term of this patent is extended or adjusted under 35 U.S.C. 154(b) by 139 days.

(21) Appl. No.: 17/736,153

(22) Filed: May 4, 2022

(65) Prior Publication Data
US 2023/0359546 A1 Nov. 9, 2023

(51) Int. Cl.
- *G06F 9/44* (2018.01)
- *G06F 11/36* (2006.01)
- *G06N 5/045* (2023.01)

(52) U.S. Cl.
CPC ...... *G06F 11/3684* (2013.01); *G06F 11/3688* (2013.01); *G06F 11/3692* (2013.01); *G06N 5/045* (2013.01)

(58) Field of Classification Search
None
See application file for complete search history.

(56) References Cited

U.S. PATENT DOCUMENTS

| | | | |
|---|---|---|---|
| 7,146,304 B1 * | 12/2006 | Cash | G06Q 10/10 703/22 |
| 10,204,033 B2 | 2/2019 | Simoni | |
| 10,691,585 B2 | 6/2020 | Meliou et al. | |
| 2004/0015424 A1 * | 1/2004 | Cash | G06Q 10/06375 705/35 |
| 2014/0075242 A1 * | 3/2014 | Dolinina | G06F 11/3672 714/27 |
| 2016/0019135 A1 | 1/2016 | Gotlieb et al. | |

(Continued)

FOREIGN PATENT DOCUMENTS

CN  108415846 B  10/2021

OTHER PUBLICATIONS

Boonmepipit et al., "Test Case Generation from BPMN with DMN," Dept. of Computer Engineering, Faculty of Engineering, Chulalongkorn Univ., Bangkok, Thailand, Dec. 9-11, 2019, pp. 92-96.

(Continued)

*Primary Examiner* — Qamrun Nahar
(74) *Attorney, Agent, or Firm* — Kilpatrick Townsend & Stockton LLP

(57) ABSTRACT

Test scenarios can be generated for decision models on a computer according to some examples. In one example, a system can determine groupings of user input tests for a decision model based on outputs produced by inputting the user input tests into the decision model. Each grouping can include a portion of the user input tests. For each grouping, the system can determine an impact score for each input for each user input test. The system can determine sub-groupings within each grouping based on the impact scores for the inputs. The system can then identify a particular user input test within each sub-grouping. The system can then generate a test scenario file for the decision model based on the particular user input test for use in testing the decision model.

20 Claims, 5 Drawing Sheets

(56) References Cited

U.S. PATENT DOCUMENTS

2021/0081294 A1\* 3/2021 Golubev ............ G06F 11/3664
2021/0319333 A1\* 10/2021 Lee ........................ G06N 20/00

OTHER PUBLICATIONS

Kumar et al., "Software testing optimization through test suite reduction using fuzzy clustering," CSIT, Sep. 2013, pp. 253-260.
Saraph et al., "Test Case Generation and Reduction by Automated Input-Output Analysis,", 2003 IEEE, pp. 768-773.
Sun, "A Constraint-based Test Suite Reduction Method for Conservative Regression Testing," Journal of Software, vol. 6, No. 2, Feb. 2011, pp. 314-321.

\* cited by examiner

REDUCING COMPUTING POWER FOR GENERATING TEST SCENARIO FILES FOR DECISION MODELS

TECHNICAL FIELD

The present disclosure relates generally to test scenario file generation. More specifically, but not by way of limitation, this disclosure relates to reducing computing power for generation of test scenario files for decision models.

BACKGROUND

Decision tables, also known as decision models, can be used to specify which operations to execute based on given input conditions. Each entry in the decision model can specify whether (or in what order) a corresponding operation is to be performed based on the set of input conditions associated with the entry. Although decision models are popular due to their readability and ease of understanding, the decision logic expressed in decision tables can also be represented in other ways, such as with decision trees or in a programming language as "if-then-else" and "switch-case" statements.

Decision models can be used in a variety of industries for numerous purposes. One use of decision models is to drive the logic of a computer program. For example, a decision model, such as a lookup table, may be embedded in the logic of a computer program to control how the computer program responds to certain inputs. In one example, a computer program can include a lookup table that contains a range of possible input values and a function pointer to the section of program code used to process the input. The computer program can rely on the lookup table to drive the program's logic. Another use of decision models is to describe decisions and rules for an organization, for example using the Decision Model & Notation (DMN) standard.

DETAILED DESCRIPTION

Figure 1:
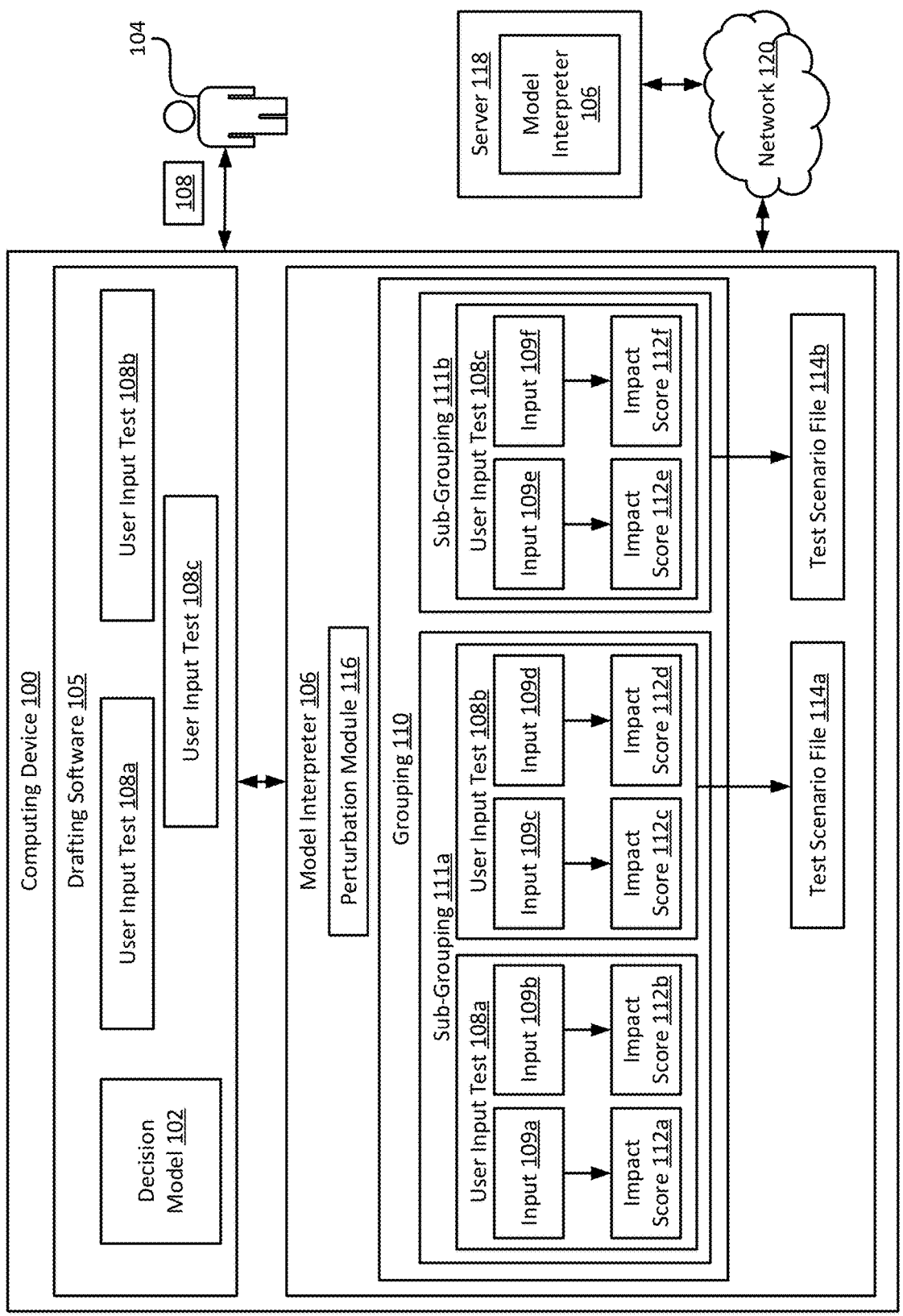
FIG. 1 shows a block diagram of an example of a computing device for generating test scenario files for a decision model according to some aspects of the present disclosure.

During the creation of a decision model, a user can manually enter a user input test into an aspect of the decision model to validate the corresponding output. User input tests can include one or more inputs and one or more expected outputs, and can test a particular rule within the decision model. After the authoring of the decision model is completed, test scenario files for the decision model can be generated. Test scenario files can be used to validate outputs for the completed decision model, and can cover higher-level scenarios than user input tests. For example, a test scenario file may include multiple inputs and conditions to test multiple rules in the decision model. Additionally, the test scenario file may test the end-to-end functionality of the decision model, rather than portions of the decision model. Test scenario files can be executed automatically in a full build of a decision model to ensure that a particular decision model output is correct based on the inputs specified in the test scenario file. But using test scenario files to test every possible condition for the decision model can involve significant computing power, and it can increase latency and runtime for executing the decision model. Additionally, creating the large number of test scenario files may be time consuming, and may involve manually recreating many of the user input tests in the new test scenario file format. It may not be feasible to automatically generate test scenario files based on the user input tests, as hundreds or more user input tests may be involved in creating the decision model. Such numbers of test scenario files may consume so many computing resources that maintaining the decision model build can be negatively affected.

Some examples of the present disclosure can overcome one or more of the above-mentioned problems via automatically generating relevant test scenario files for the decision model. The test scenario files may be generated from the user input tests used to create the decision model, but from non-redundant user input tests. User input tests with redundant or irrelevant inputs or outputs can be disregarded to ensure that necessary test scenario files are generated. The remaining non-redundant user input tests can be used to generate test scenario files that can validate the most important conditions and rules for the decision model. In this way, the computing power for, and latency caused by, generating the test scenarios and executing the decision model can be reduced, without compromising the validation of the decision model.

In one particular example, a computing device can generate test scenario files from user input tests used in creating a decision model from non-redundant user input tests. Each user input test can include one or more inputs for the decision model and one or more outputs produced by the decision model based on the one or more inputs. The user input tests can be arranged into groupings according to their outputs. For example, user input tests with the same or similar outputs can be grouped together. Additionally, in order to include all relevant rules of each user input test in a grouping, the user input tests within each grouping can be re-grouped into sub-groupings according to their relevant inputs. For example, user input tests within a grouping with the same or similar relevant inputs can be grouped together into a sub-grouping. To determine the relevancy of each input in an user input test, the input values for the user input tests may be perturbated and inputted into the decision model. The input that generates an output with the most variation can be identified as a relevant input, due to its more significant impact on the decision model result. Each of the sub-groupings can represent user input tests that may cover the same rules of the decision model and may therefore be redundant. A user input test from each sub-grouping may be used to incorporate the generated test scenario files that can be automatically executed upon executing a build of the decision model.

In some examples, a test scenario file can be generated from one or more user input tests. The test scenario file can be an example of a use case for the decision model. For example, if the decision model is used to determine credit scores, the test scenario file can include characteristics for a hypothetical user that can be inputted into the decision model for outputting a credit score. The outputted credit score can be checked against the expected output included in the test scenario file to determine if the decision model is executing as expected.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a computing device 100 for generating test scenario files 114 for a decision model 102 according to some aspects of the present disclosure. In this example, the computing device 100 can be a laptop computer, desktop computer, server, tablet, or mobile phone. The computing device 100 may include drafting software 105 for drafting a decision model 102 and a model interpreter 106 for determining relevant (e.g., non-redundant) inputs 109 from user input tests 108 and generating test scenario files 114 based on the non-redundant user input tests 108.

The computing device 100 may be operated by a user 104. For example, the user may transmit commands to the computing device 100 to draft or construct the decision model 102 using the drafting software 105. In some examples, the drafting software 105 may include decision tables and decision logic. Examples of the drafting software 105 can include word processing software such as Microsoft Excel®; Decision Model and Notation (DMN) editor by Red Hat®; or a web-based editor included in a website. The user 104 may transmit user input tests 108a-d to the computing device 100 for use in drafting the decision model 102. For example, the user 104 may select particular rules or decision logic in the drafting software 105 to be included in the decision model 102, and may test the particular rules using the user input tests 108a-d.

In some examples, the model interpreter 106 may be standalone software that is located on the computing device 100 and configured to operate independently of the drafting software 105. In other examples, the model interpreter 106 can be a plugin or extension for the drafting software 105. In still other examples, the model interpreter 106 can be located on a server 118 that is remote from the computing device 100. The computing device 100 can transmit (e.g., upload) the user input tests 108a-d to the server 118 over a network 120, such as a local area network or the Internet. In some examples, the computing device 100 can additionally transmit the decision model 102 to the server 118. The server 118 can receive the user input tests 108a-d and, in some cases, the decision model 102, and can responsively execute the model interpreter 106 to determine relevant inputs 109 from user input tests 108. In some examples, the server 118 may execute the model interpreter 106 to interact with the decision model 102 located on the computing device 100 using the network 120.

The model interpreter 106 may determine relevant inputs 109 from user input tests 108 by determining one or more groupings 110 for the user input tests 108a-d. The groupings 110 can be based on outputs produced when applying the user input tests 108a-d to the decision model 102. For example, user input tests 108a-b may produce the same output when inputted into the decision model 102, and may therefore be placed into a grouping 110. In some examples, additional user input tests 108 may produce the same output (that is different from the output produced by user input tests 108a-b) when inputted into the decision model 102, and may therefore be placed into a second grouping.

In some examples, a grouping 110 may include only a single user input test 108. The computing device 100 may therefore generate a test scenario file 114 for the decision model 102 based on the single user input test 108 within the grouping 110. For example, the computing device 100 may execute the model interpreter 106, the drafting software 105, or another software component to generate the test scenario file 114. In other examples, a grouping 110 may include two or more user input tests 108. Only one user input test 108 may be needed for use in generating test scenario files 114, as additional test scenario files 114 created from all user input tests 108 from a grouping 110 may add unnecessary redundancy. The model interpreter 106 can determine the non-redundant user input tests 108 within each grouping 110 by determining an impact score 112 for each input 109 from user input test 108. The impact score 112 can be an indication of the relevancy of an input 109 from a user input test 108 for the decision model 102. The non-redundant user input tests 108 may be used to generate test scenario files 114.

The model interpreter 106 can determine the impact score 112 of each input 109 from user input test 108 within each grouping 110 by executing a perturbation module 116. The perturbation module 116 can perturbate the values of each input 109 from each user input test 108. The perturbated user input tests 108 can be inputted into the decision model 102, and the resulting perturbated outputs can be analyzed by the model interpreter 106 to determine the impact scores 112. For example, inputs 109 from user input tests 108 resulting in perturbated outputs with high variation can be associated with higher impact scores 112, as higher variation can indicate that the input 109 from the user input test 108 has a greater relevancy to the decision model 102. The model interpreter 106 can determine a user input test 108 with unique inputs 109 that have a high impact score 112 for each grouping 110, which can be used to generate a test scenario file 114.

In some examples, the model interpreter 106 may further group the user input tests 108 based on the relevance of the inputs 109 for the user input tests 108. The model interpreter 106 may identify non-redundant inputs 109 based on the impact scores 112, and may sort the user input tests 108 into sub-groupings 111 within each grouping 110 based on their non-redundant inputs 109. For example, the grouping 110 may include user input tests 108a-c, which include inputs 109a-f and associated impact scores 112a-f. The model interpreter 106 may determine that user input tests 108a-b have the same non-redundant inputs 109 based on their impact scores 112, and may group user input tests 108a-b into a first sub-grouping 111a. The model interpreter 106 may additionally determine that user input test 108c has unique inputs 109e-f based on the associated impact scores 112e-f, and may group user input test 108c into a second sub-grouping 111b. Each sub-grouping 111 may include user input tests 108 that each include the non-redundant input 109 yet include differing redundant inputs 109. The model interpreter 106 may identify a user input test 108 from each sub-grouping 111 to be used to generate the test scenario file 114. For example, if the sub-grouping 111 includes more than one user input test 108, the model interpreter 106 may randomly identify a user input test 108 in the sub-grouping 111.

The test scenario files 114a-b can be generated by the drafting software 105, the model interpreter 106, or any other software on the computing device 100 or the server 118. In some examples, the test scenario files 114a-b may be automatically generated in response to the user 104 creating the decision model 102 using the user input tests 108a-d. In the example depicted in FIG. 1, test scenario file 114a can be generated from user input test 108b, and test scenario file 114b can be generated from user input test 108c. In some examples, the test scenario files 114a-b may be incorporated into the decision model 102. For example, the decision model 102 (including the test scenario files 114a-b) may be built in a build environment. When the decision model 102 is executed in the build environment, the test scenario files 114a-b may automatically execute as well. The test scenario files 114a-b may test the decision model 102 to validate outputs of the decision model 102.

While FIG. 1 depicts certain components for exemplary purposes, the components shown in FIG. 1 are intended to be illustrative and non-limiting. Other examples may include more components, fewer components, different components, or a different arrangement of the components shown in FIG. 1. For example, although FIG. 1 depicts a particular number of sub-groupings 111a-b that each include a particular number of user input tests 108, inputs 109, and associated impact scores 112, other examples may involve other numbers of sub-groupings 111, user input tests 108, inputs 109, or impact scores 112. Additionally, the sub-groupings 111, impact scores 112, inputs 109, and test scenario files 114 may be determined or generated using any number and combination of software components.

Figure 2:
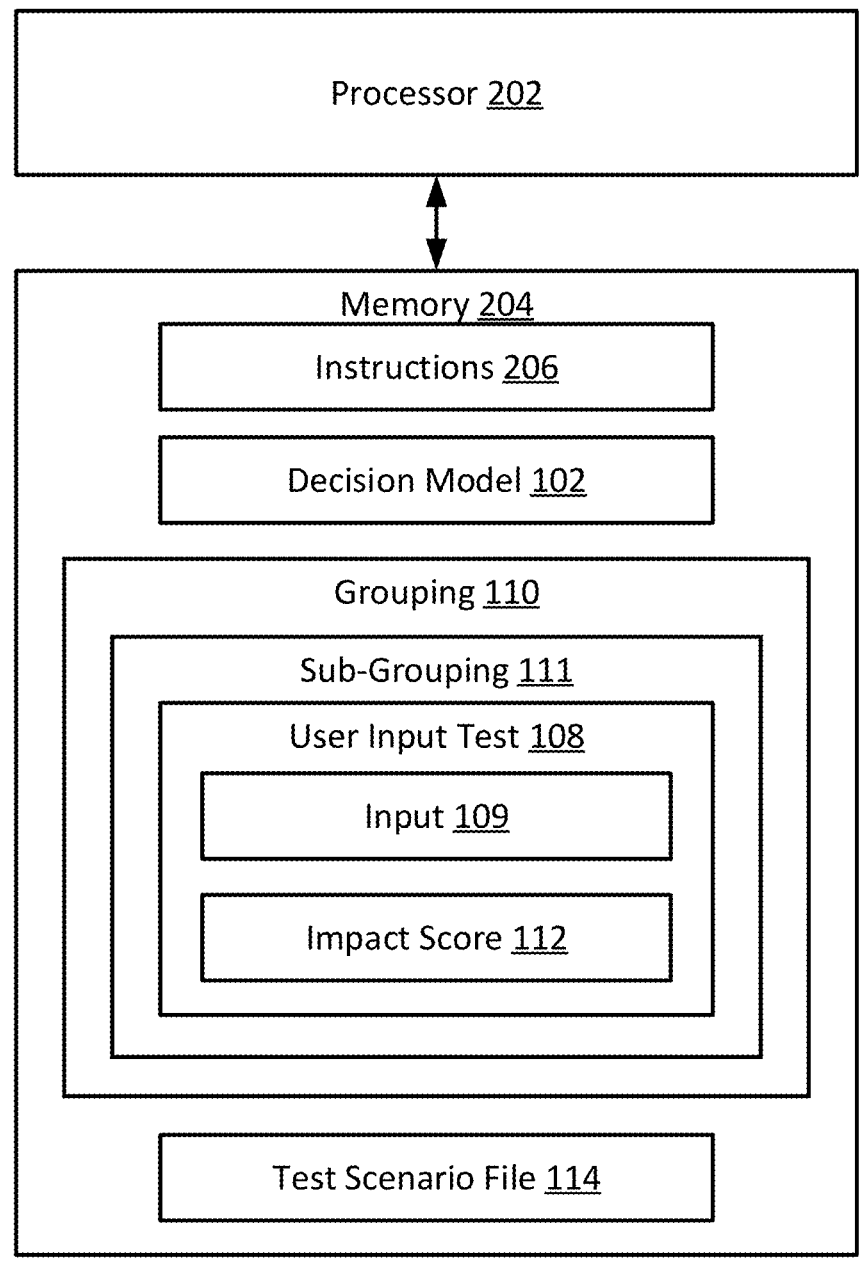
FIG. 2 shows a block diagram of another example of a computing device for generating test scenario files for a decision model according to some aspects of the present disclosure.

FIG. 2 shows a block diagram of another example of a computing device 200 for generating test scenario files 114 for a decision model 102 according to some aspects of the present disclosure. The computing device 200 includes a processor 202 communicatively coupled to a memory 204. In some examples, the processor 202 and the memory 204 can be parts of the same computing device, such as the computing device 100 of FIG. 1. In other examples, the processor 202 and the memory 204 can be distributed from (e.g., remote to) one another.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C#, etc. In some examples, the instructions 206 can include the decision model 102 of FIG. 1.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processor 202 can execute the instructions 206 to determine relevant inputs 109 from user input tests 108 for use in generating test scenario files 114 for the decision model 102. For example, the processor 202 can determine a grouping 110 of a portion of the user input tests 108. The user input tests 108 may have been previously used in creating the decision model 102. Each user input test 108 may include one or more inputs 109 and one or more outputs that may be produced after inputting the one or more inputs 109 into the decision model 102. The user input tests 108 may be grouped according to their outputs. For each grouping 110, the processor 202 can determine an impact score 112 for each input 109 for each user input test 108 within the grouping 110. The processor 202 can determine sub-groupings 111 for user input tests 108 within the grouping 110 based on the impact scores 112 for each input 109. The processor 202 can identify non-redundant user input tests 108 within the sub-grouping 111 based on impact scores 112, such as user input tests 108 with inputs 109 that have a high impact score 112. The processor 202 can additionally generate a test scenario file 114 for the decision model 102 based on the non-redundant user input tests 108. The test scenario file 114 can be used in validating the decision model 102.

Figure 3:
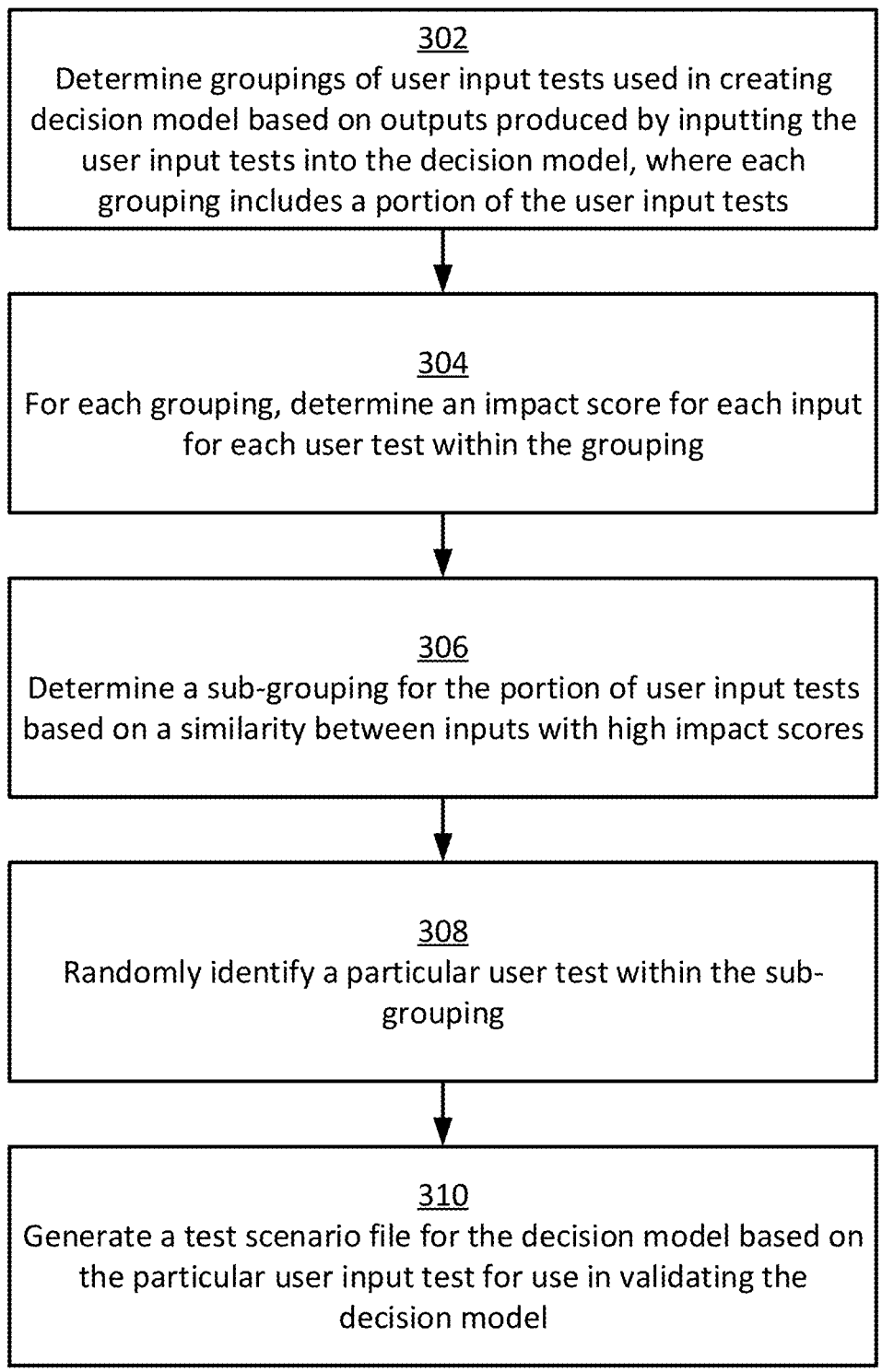
FIG. 3 is a flow diagram of a process for determining non-redundant user input tests for generating test scenario files for a decision model according to some aspects of the present disclosure.
Figure 4A:
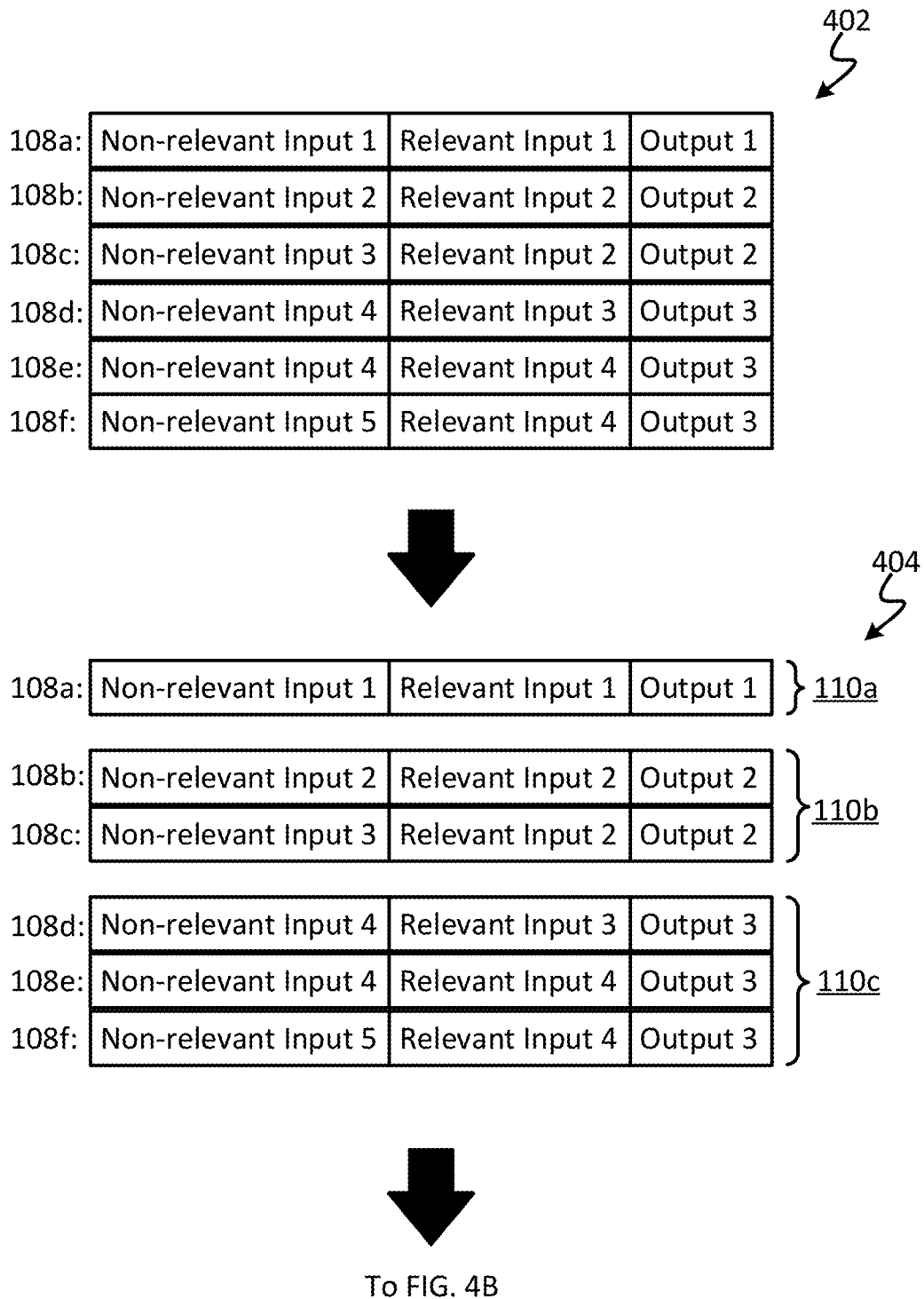
FIGS. 4A and 4B are a flow chart of an example of a process for generating test scenario files for a decision model according to some aspects of the present disclosure.
Figure 4B:
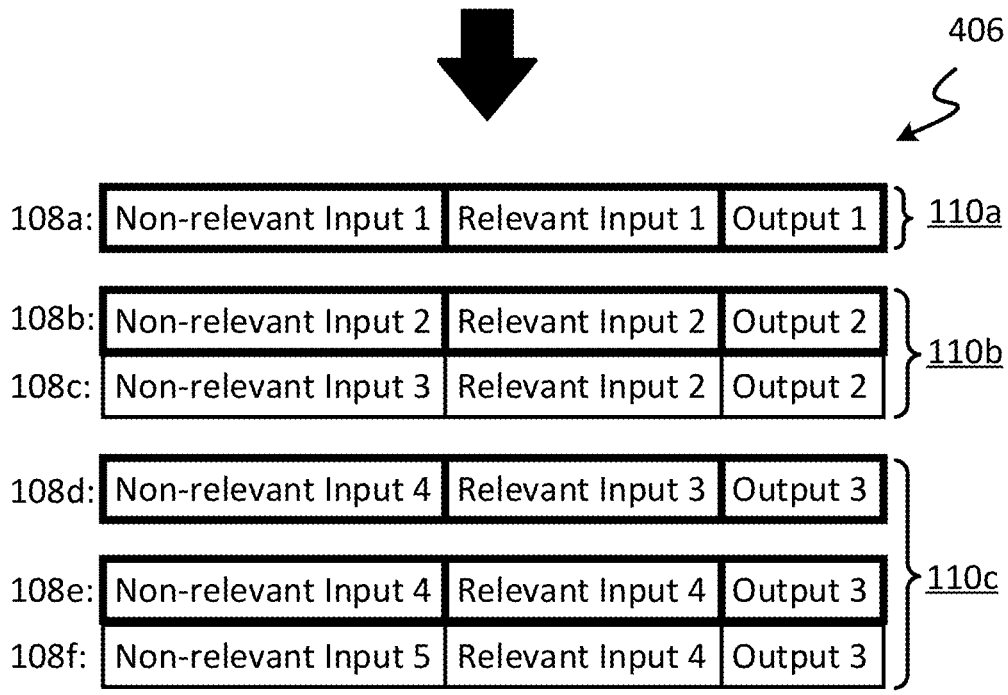
Figure 4B:
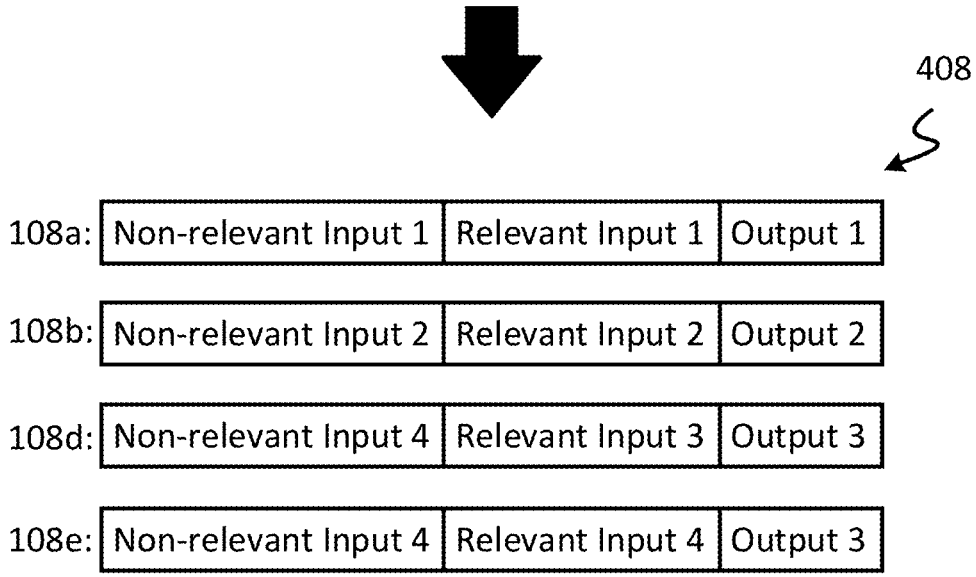

In some examples, the processor 202 can implement some or all of the steps shown in FIGS. 3-4. Other examples can include more steps, fewer steps, different steps, or a different order of the steps than is shown in FIGS. 3-4. The steps of FIGS. 3-4 are discussed below with reference to the components discussed above in relation to FIGS. 1-2.

Referring now to FIG. 3, at block 302, the processor 202 determines groupings 110 of user input tests 108 for a decision model 102 based on outputs produced by inputting the user input tests 108 into the decision model 102. Each grouping 110 can include a portion of the user input tests 108. An example of such groupings 110 is depicted in FIG. 4A.

For example, block 402 of FIG. 4A depicts six user input tests 108a-f. Each user input test 108 includes non-relevant input, relevant input, and an output. The output can be produced by inputting the input 109 (e.g., the non-relevant input and the relevant input) for each user input test 108 into the decision model 102. Some user input tests 108 may have the same or similar outputs. In one particular example, the decision model 102 may be a model for determining credit scores for users based on characteristics of the users. The decision model 102 may be constructed from rules or decision logic dictating how certain user characteristics (e.g., inputs) affect the user's credit score (e.g., outputs). Each user input test 108 may represent a theoretical user. For example, the relevant inputs can include relevant characteristics of the theoretical user, such as number of credit cards, income, or lending history. The non-relevant inputs can include non-relevant characteristics of the theoretical user, such as name, height, marital status, or gender. The output can include the credit score of the theoretical user after the non-relevant inputs and relevant inputs are inputted into the decision model 102. One example of output 1, output 2, and output 3 can be ranges of credit scores, such as from 580-669, from 670-739, and from 740-799, respectively.

At block 404, the processor 202 can identify user input tests 108 with the same outputs. For example, the processor 202 can identify that user input tests 108b-c each have output 2, and that user input tests 108d-f each have output 3. The processor 202 can then group user input tests 108 together according to their outputs. For example, the processor 202 can group user input test 108a into a first grouping 110a for output 1, user input tests 108b-c into a second grouping 110b for output 2, and user input tests 108d-f into a third grouping 110c for output 3.

Referring back to FIG. 3, at block 304, for each grouping 110, the processor 202 can determine an impact score 112 for each input 109 from each user input test 108 within the grouping 110. An input 109 from a user input test 108 having a relatively high impact score 112 can be considered to have a greater relevancy. In some examples, the impact scores 112 can be determined using model-agnostic techniques for interpreting models. Examples of such techniques can include the local interpretable model agnostic explanation (LIME) technique, the Shapley additive explanations (SNAP) technique, or any other model-agnostic technique typically used to vary inputs and analyze outputs produced from models (such as machine-learning models). Such techniques can be used to determine the strength of an input's contribution to an output, and may be used to generate an impact score 112 for an input 109 from user input test 108. In some examples, the techniques can be implemented by the perturbation module 116 depicted in FIG. 1. In one particular example, the values for inputs 109 of a user input test 108 may be perturbated and inputted into the decision model 102 to produce perturbated outputs. The processor 202 may determine the impact score 112 based on the amount of variation in the perturbated outputs. An input 109 from user input test 108 with relatively high variation in perturbated outputs due to perturbated inputted values can indicate that the input has a high impact on outputs for the decision model 102.

For example, grouping 110b depicted in FIGS. 4A-B can include user input tests 108b-c grouped according to their output of a credit score range between 670-739. User input test 108b may include an input relating to user names and an input relating to user income. User input test 108c may include an input relating to user heights and an input relating to user income. The processor 202 can perturbate the values of the inputs 109 for user input tests 108b-c, such as by varying the names, heights, and incomes for each user input test 108b-c. The processor 202 can input the user input test 108 with a perturbated input value into the decision model 102 to produce a perturbated output. The processor 202 can determine an impact score 112 for each input 109 for the user input tests 108b-c based on the perturbated outputs. The impact scores 112 may indicate the relevance of each input 109. For example, the impact scores 112 for user input test 108b can indicate that user names are a non-relevant input and user incomes are a relevant input. Additionally, the impact scores 112 for inputs 109 from user input test 108c can indicate that user heights are a non-relevant input and user incomes are a relevant input.

Referring back to FIG. 3, at block 306, for each grouping 110, the processor 202 can determine a sub-grouping 111 for user input tests 108 within the grouping 110 based on a similarity between high impact scores 112. For example, the processor 202 can determine sub-groupings 111 based on relevant inputs. As depicted in FIG. 4B, sub-groupings 111 can be determined for user input tests 108d-f within grouping 110c. The first sub-grouping can include user input test 108d, which includes relevant input 3. The second sub-grouping can include user input tests 108e-f, which each include relevant input 4.

Referring back to FIG. 3, at block 308, for each sub-grouping 111, the processor 202 can identify a particular user input test 108 within the sub-grouping 111 randomly. For example, for grouping 110b, the processor 202 may determine that user input test 108b and user input test 108c have the same relevant input 2 (e.g., the user income input). Because user input tests 108b-c differ only in non-relevant inputs, the processor 202 may randomly determine one of user input tests 108b-c to be used in generating a test scenario file 114.

Block 408 of FIG. 4 depicts identified user input tests 108a, 108b, 108d, and 108e. In some examples, the processor 202 may identify multiple user input tests 108 within a grouping 110 as having the same relevant input values. For example, both user input tests 108e and 108f within grouping 110c may have the same relevant input 4. The processor 202 may identify one of user input tests 108e-f to be used in generating a test scenario file 114. Additionally, user input test 108d may include unique relevant inputs 109, that are different from the user input tests 108e-f. Therefore, the processor 202 may identify both user input tests 108d-e to be used in generating test scenario files 114. In this way, the processor 202 can identify all relevant inputs 1-4 for use in generating test scenario files 114.

Referring back to FIG. 3, at block 310, for each sub-grouping 111, the processor 202 can generate a test scenario file 114 for the decision model 102 based on the particular user input test 108 for use in validating the decision model 102. For groupings 110 or sub-groupings 111 that include multiple identified user input tests 108, the processor 202 may generate a test scenario file 114 for each of the identified user input tests 108. Alternatively or additionally, a test scenario file 114 may be generated from multiple identified user input tests 108 from one or more groupings 110 or sub-groupings 111. In some examples, the test scenario files 114 may be incorporated into the decision model 102. For example, the processor 202 may further execute a build of the decision model 102. In response to execution of the build of the decision model 102, the processor 202 may additionally execute the test scenario files 114 to validate the decision model 102. For example, the test scenario file 114 may include an input and an expected output that is compared to an output produced by the build of the decision model 102 to ensure that the decision model 102 is functioning as expected.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory including instructions that are executable by the processor for causing the processor to:
  determine a plurality of groupings of a plurality of user input tests used in creating a decision model based on a plurality of outputs produced by inputting the plurality of user input tests into the decision model, each grouping of the plurality of groupings comprising a portion of the plurality of user input tests; and
  for each grouping of the plurality of groupings:
    determine an impact score for each input of a plurality of inputs for each user input test within the grouping;
    determine a sub-grouping of the portion of the plurality of user input tests based on a similarity between inputs with high impact scores;

randomly identify a particular user input test within the sub-grouping; and generate a test scenario file for the decision model based on the particular user input test for use in validating the decision model.

2. The system of claim 1, wherein the instructions are further executable by the processor for causing the processor to determine the impact score for each input by:
perturbating the plurality of inputs for each user input test;
inputting the plurality of inputs into the decision model to produce a plurality of perturbated outputs; and
determining the impact score for each input of the plurality of inputs for each user input test based on an amount of variation between the plurality of perturbated outputs.

3. The system of claim 1, wherein each user input test of the plurality of user input tests comprises an input and an output for validating a rule within the decision model, and wherein the test scenario file comprises a plurality of inputs and an output for validating the decision model.

4. The system of claim 1, wherein the instructions are further executable by the processor for causing the processor to determine the impact score for each input of the plurality of inputs for each user input test by applying a model-agnostic technique to each input of the plurality of inputs.

5. The system of claim 1, wherein the instructions are further executable by the processor for causing the processor to determine the plurality of groupings of the plurality of user input tests by:
identifying the portion of the plurality of user input tests with a same output; and
grouping together the portion of the plurality of user input tests with the same output.

6. The system of claim 1, wherein the instructions are further executable by the processor for causing the processor to:
execute a build of the decision model; and
in response to executing the build of the decision model, executing the test scenario file to validate the decision model by:
inputting the test scenario file into the decision model to produce an output; and
validating that the output matches an expected output included in the test scenario file.

7. The system of claim 1, wherein the instructions are further executable by the processor for causing the processor to generate the test scenario file using a plurality of user input tests from the plurality of groupings.

8. A method comprising:
determining, by a processor, a plurality of groupings of a plurality of user input tests used in creating a decision model based on a plurality of outputs produced by inputting the plurality of user input tests into the decision model, each grouping of the plurality of groupings comprising a portion of the plurality of user input tests; and
for each grouping of the plurality of groupings:
determining, by the processor, an impact score for each input of a plurality of inputs for each user input test within the grouping;
determining, by the processor, a sub-grouping of the portion of the plurality of user input tests based on a similarity between inputs with high impact scores;
randomly identifying, by the processor, a particular user input test within the sub-grouping; and
generating, by the processor, a test scenario file for the decision model based on the particular user input test for use in validating the decision model.

9. The method of claim 8, wherein determining the impact score for each input further comprises:
perturbating the plurality of inputs for each user input test;
inputting the plurality of inputs into the decision model to produce a plurality of perturbated outputs; and
determining the impact score for each input of the plurality of inputs for each user input test based on an amount of variation between the plurality of perturbated outputs.

10. The method of claim 8, wherein each user input test of the plurality of user input tests comprises an input and an output for validating a rule within the decision model, and wherein the test scenario file comprises a plurality of inputs and an output for validating the decision model.

11. The method of claim 8, wherein determining the impact score for each input of the plurality of inputs for each user input test further comprises applying a model-agnostic technique to each input of the plurality of inputs.

12. The method of claim 8, wherein determining the plurality of groupings of the plurality of user input tests further comprises:
identifying the portion of the plurality of user input tests with a same output; and
grouping together the portion of the plurality of user input tests with the same output.

13. The method of claim 8, further comprising:
execute a build of the decision model; and
in response to executing the build of the decision model, executing the test scenario file to validate the decision model by:
inputting the test scenario file into the decision model to produce an output
validating that the output matches an expected output included in the test scenario file.

14. The method of claim 8, further comprising generating the test scenario file using a plurality of user input tests from the plurality of groupings.

15. A non-transitory computer-readable medium comprising program code that is executable by a processor for causing the processor to:
determine a plurality of groupings of a plurality of user input tests used in creating a decision model based on a plurality of outputs produced by inputting the plurality of user input tests into the decision model, each grouping of the plurality of groupings comprising a portion of the plurality of user input tests; and
for each grouping of the plurality of groupings:
determine an impact score for each input of a plurality of inputs for each user input test within the grouping;
determine a sub-grouping of the portion of the plurality of user input tests based on a similarity between inputs with high impact scores;
randomly identify a particular user input test within the sub-grouping; and
generate a test scenario file for the decision model based on the particular user input test for use in validating the decision model.

16. The non-transitory computer-readable medium of claim 15, wherein the program code is further executable by the processor for causing the processor to determine the impact score for each input by:
perturbating the plurality of inputs for each user input test;
inputting the plurality of inputs into the decision model to produce a plurality of perturbated outputs; and determining the impact score for each input of the plurality of inputs for each user input test based on an amount of variation between the plurality of perturbated outputs.

17. The non-transitory computer-readable medium of claim 15, wherein each user input test of the plurality of user input tests comprises an input and an output for validating a rule within the decision model, and wherein the test scenario file comprises a plurality of inputs and an output for validating the decision model.

18. The non-transitory computer-readable medium of claim 15, wherein the program code is further executable by the processor for causing the processor to determine the impact score for each input of the plurality of inputs for each user input test by applying a model-agnostic technique to each input of the plurality of inputs.

19. The non-transitory computer-readable medium of claim 15, wherein the program code is further executable by the processor for causing the processor to determine the plurality of groupings of the plurality of user input tests by:
    identifying the portion of the plurality of user input tests with a same output; and
    grouping together the portion of the plurality of user input tests with the same output.

20. The non-transitory computer-readable medium of claim 15, wherein the program code is further executable by the processor for causing the processor to:
    execute a build of the decision model; and
    in response to executing the build of the decision model, executing the test scenario file to validate an output of the decision model by:
        inputting the test scenario file into the decision model to produce an output; and
        validating that the output matches an expected output included in the test scenario file.

* * * * *